May 12, 1959 E. HARRISON, JR 2,886,811
ELECTROMAGNETIC BEAM SCANNING AND REFLECTION
Filed June 7, 1957
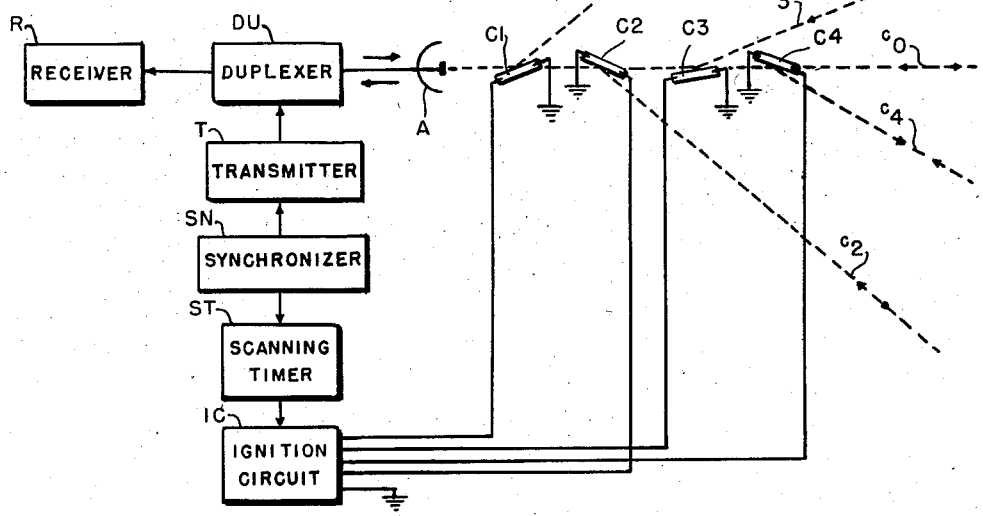
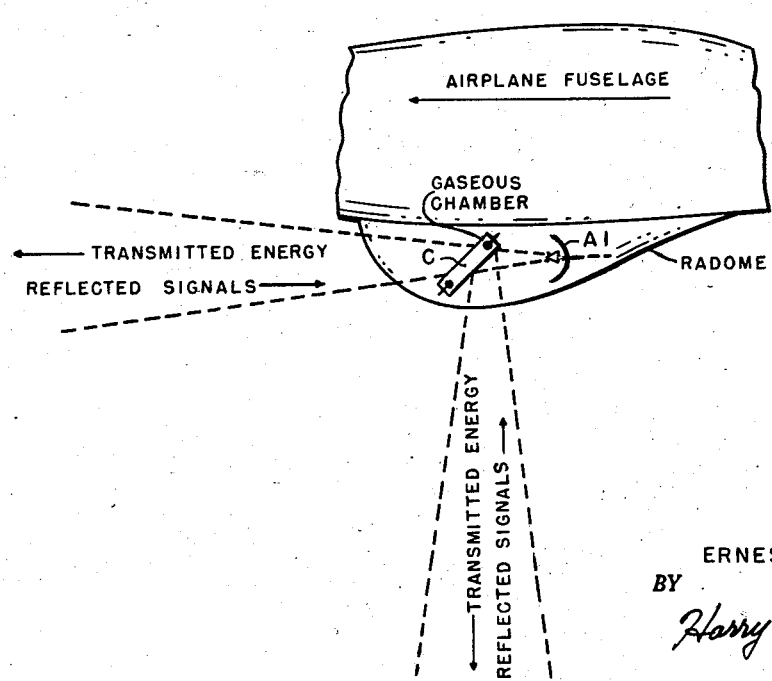
INVENTOR,
ERNEST HARRISON, JR
BY
Harry M. Saragovitz
ATTORNEY.

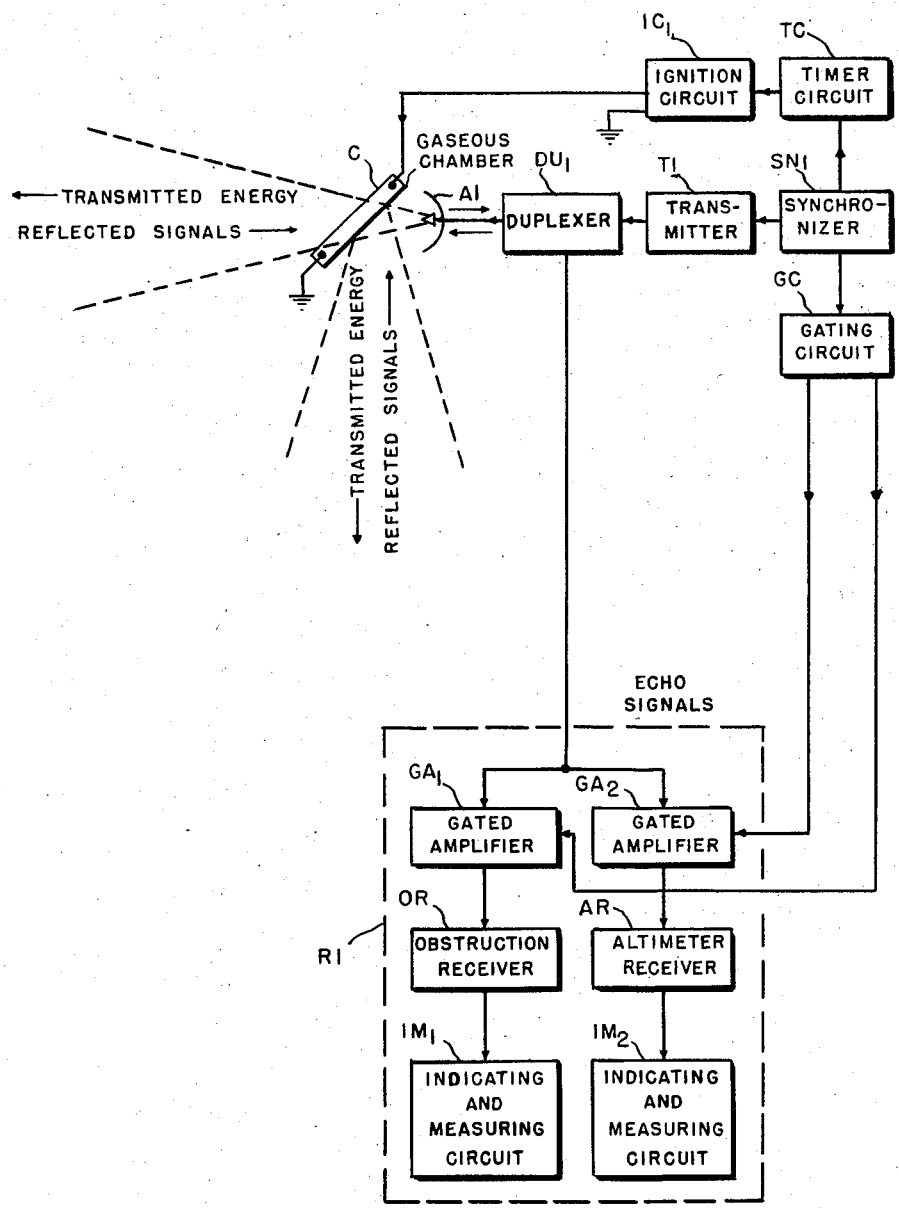

United States Patent Office 2,886,811
Patented May 12, 1959

2,886,811

ELECTROMAGNETIC BEAM SCANNING AND REFLECTION

Ernest Harrison, Jr., Towson, Md.

Application June 7, 1957, Serial No. 664,444

3 Claims. (Cl. 343—11)

(Granted under Title 35, U.S. Code (1952), sec. 266)

The invention herein described may be manufactured and used by and for the Government for governmental purposes without the payment of any royalty thereon.

This application is a continuation-in-part of application Serial No. 643,898, filed March 4, 1957, now abandoned.

The invention relates to electromagnetic wave control equipment and particularly to such equipment for use in an object locating or distance measuring system of the pulse or CW-reflection type, such as radar systems, aircraft altimeters and the like.

A general object of the invention is to improve such equipment from the standpoint of simplification, elimination of the usual movable antenna and scan control mechanisms, and reduction in weight and space requirements, and thus to reduce the initial and maintenance costs of the systems in which it is used.

A more specific object is to provide an electromagnetic beam scanning device which is simple, rapid in operation, requires no large parts movable with respect to its other parts, and produces with a minimum of equipment and circuitry any desired angle of scan.

Another specific object is to produce alternately with the same apparatus elements the directional control of the transmitted and reflected wave energy required in two systems of the pulse or CW-reflection type having different functions, such as object location and altitude determination.

The arrangements of the invention for attaining these objects utilizes for the main control elements one or more chambers made from a material normally transparent to electromagnetic wave energy, containing a gaseous material which can be easily ionized and deionized and which, when ionized, will provide a fairly uniform electron density throughout the chamber. It is known that when the gaseous material in such a chamber is in the deionized condition, electromagnetic wave energy may be propagated therethrough with little or no reflection, and that by proper choice of the chamber dimensions and shape and the electron density of the gaseous material therein, the chamber may be made to operate as a plane reflector of the electromagnetic wave energy impressed thereon when that material is in the ionized condition.

In accordance with the invention, applicant utilizes the above-mentioned known properties of one or more such gas-filled chambers in combination with proper location and orientation of the chamber or chambers with respect to an antenna radiating electromagnetic energy in a radar or other object locating or distance measuring system of the pulse- or CW-reflection type to provide the directional control of the transmitted and reflected wave energy required for proper operation of such a system.

One specific embodiment of the invention is a simple, fast-operating, antenna beam scanning arrangement having no large moving parts, suitable for use in a search radar system. This arrangement employs a number of like gas-filled chambers such as described above, mounted in tandem in front of a stationary common transmitting and receiving antenna of the radar system and respectively oriented at predetermined different angles with respect to the direction of the electromagnetic beam radiated by that antenna. When the gas in each such chamber is in the deionized condition the electromagnetic beam applied thereto will pass through it in a straight line, but when the gas therein is ionized each such chamber serves to reflect the impressed beam at a respectively different angle determined by its orientation, and thus effectively to point the antenna beam in a different direction. By causing the gaseous material in the several chambers to be ionized in the proper sequence, the pointing of the antenna beam can be changed so that it successively "illuminates" different adjoining areas of a target field, and thus scans the desired area.

Another embodiment of the invention is a combined forward-looking obstruction detection system and an altimeter of the pulse or CW-reflection type, which may be installed on an airplane or other aircraft. It comprises apparatus including a single plane surface comprising one or more gas-filled chambers such as above described mounted in front of the common transmitting and receiving antenna of the radar equipment on that aircraft in the air path of the radiated and reflected wave energy, and suitably oriented with respect to the direction of the electromagnetic beam radiated thereby during transmitting intervals, for providing the necessary directional control of the transmitted and reflected electromagnetic energy to obtain information on the location of obstructions or other targets in front of the aircraft when the chamber is deionized and information on the altitude of the aircraft above the ground when the chamber is ionized; and means for providing suitable timing triggers for causing the alternate ionization and deionization of the gas in the gas filled chamber to provide these functions.

The various objects and features of the invention will be better understood from the following detailed description thereof when read in conjunction with the accompanying drawings in which:

Figure 1 shows a schematic diagram, partially in block form, of an antenna electromagnetic beam scanning system, applied to a radar or other object locating system of the reflection search type, embodying the invention;

Figure 2 shows a schematic diagram, partially in block form, of a combined radar and altimeter arrangement embodying the invention, adapted for use on an aircraft to provide alternately, information on the location of obstructions in front of the aircraft and information on the altitude of the aircraft above the ground; and Figure 3 shows how the directional control element of the arrangement of Figure 2 would be mounted on an aircraft.

Referring to Figure 1, the radar system with which the antenna beam scanning arrangement of the invention is used, is shown diagrammatically therein as comprising the usual transmitter T and receiver R connected through a duplexer DU to a stationary, common transmitting and receiving antenna A. The transmitter T, for example, may be adapted for supplying short pulses of radio frequency energy to the antenna for radiation therefrom to the surrounding air medium in the form of a beam, and the receiver R for receiving and suitably processing the return pulses (radio echoes) reflected back to that antenna from distant objects (targets) in that medium on which the radiated pulses impinge. The period of the radiated pulses is chosen so as to be equal to the total time required for a wave to pass from the transmitter T to an object at the limit of the range over which the system can be operated and the reflected waves to return from that object to the receiver R. The duration of the transmitted pulse is usually made very short compared with the period of the radiated pulses which may be produced in the transmitter T, for example, by keying a radio transmitter from the output of a suitable pulse generator energized from an oscillator of suitable base frequency. The receiver R may include a radio receiving circuit of the double detection, super-heterodyne type followed by a video amplifier and a cathode ray oscilloscope synchronized with the transmitting pulse generator in a well known manner. The duplexer DU may be of any suitable type operating to block the necessarily high amplitude transmitted pulses from the receiver during radar transmitting intervals. The antenna A may be of any of the conventional, highly directional types well known in the art.

The scanning device of the invention includes a plurality of like chambers C1, C2, C3, C4 . . . mounted in tandem at a selected point in front of the antenna A in the plane of the electromagnetic beam radiated therefrom. Each of these chambers may comprise an outer shell of rectangular or other suitable shape and suitable dimensions, for example, as shown diagrammatically in the drawings, a straight tube the long dimension of which is substantially larger than the cross-sectional dimensions, made from glass, quartz or other material which is normally transparent to electromagnetic wave energy, and containing an easily ionizable and deionizable gas, such as neon, which, when ionized, provides a fairly uniform electron density throughout the chamber. The usual terminal electrodes are provided near opposite ends of each of the chambers. An ignition circuit IC controlled by a scanning timing device ST synchronized in operation with that of the transmitter T by a suitable synchronizer SN, is provided to cause an ionizing voltage to be alternately applied across the terminal electrodes of each of the chambers C1, C2, C3 and C4 to ionize the gas thereon, and to be removed from across these terminal electrodes to deionize the gas in these chambers, in any desired sequence. Each gas filled chamber so designed, when the gas therein is deionized, is adapted to propagate electromagnetic wave energy impressed thereon through it in a straight line, and, because of the proper selection of its shape, dimensions and material, and the type and electron density of the gas therein, is adapted to operate as a plane reflector of the electromagnetic wave energy impressed thereon when the gas in the chamber is ionized.

The several gas filled chambers C1, C2, C3, C4 . . . are oriented as shown with their longitudinal axes disposed at different angles with respect to the normal direction of the electromagnetic beam radiated by the antenna A in radar transmitting intervals, extending to one side or the other of the center line through the focus point of that antenna. Each such chamber, when the gas therein is in the ionized condition, provides reflection of that beam at an angle determined by the angle of its orientation. For example, with the orientation of these chambers indicated in Figure 1, the ionization of the gas in the chamber C1 will cause reflection of the outgoing beam from antenna A by that chamber so that it passes out in the direction indicated in Figure 1 by the outwardly-pointed arrow in the dashed line designated $c_1$; ionization of the gas in chamber C2 will cause reflection of that beam by that chamber so that it passes out in the direction indicated by the outwardly-pointed arrow in the dashed line $c_2$; ionization of the gas in chamber C3 will provide reflection of the beam by that chamber so that it passes out in the direction indicated by the outwardly-pointed arrow in the dashed line $c_3$; and ionization of the gas in chamber C4 will cause reflection of the beam by that chamber so that it passes out in the direction indicated by the outwardly-pointed arrow in the dashed line designated $c_4$. When the gas in all of the chambers C1, C2, C3, C4 . . . is in the deionized condition, the outgoing beam from antenna A will be transmitted in a straight line through all these chambers in the direction indicated by the outwardly-pointed arrow in the dashed line designated $c_0$. As indicated by the inwardly-pointed arrow in each of the dashed lines $c_1$, $c_2$, $c_3$, and $c_4$, the electrical energy (echoes) reflected from targets in the path of the outgoing beam from antenna A as reflected by the chamber C1, C2, C3 or C4, respectively, when the gas in that chamber only is in the ionized condition, will be sent back over the air path to the corresponding chamber which will reflect it back to the antenna A. Also, as indicated by the inwardly-pointed arrow in the dashed line $c_0$, the electrical energy (echoes) reflected from targets in the path of the outgoing beam from antenna A transmitted in a straight line through all the chambers C1 to C4 in turn when the gas in all these chambers is in the deionized condition, is sent back to that antenna over the air path and through all these chambers.

For the particular orientations indicated in Fig. 1 of the chambers C1 to C4, with respect to the direction of the outgoing beam radiated by the antenna A during transmitting intervals, the scanning timer ST would be arranged to provide the required timing control of the ignition circuit IC so that the latter will apply an ionizing voltage across the terminal electrodes of each of these chambers to cause ionization of the gas therein for a predetermined time interval and then to remove that voltage to deionize the gas in that chamber, in a particular sequence, which will cause the antenna beam to be successively pointed in the direction of the dashed lines $c_1$, $c_3$, $c_0$, $c_4$, $c_2$, $c_4$, $c_0$, $c_3$ and $c_1$. This, in effect, will cause the antenna beam to successively "illuminate" or scan different adjoining areas in the sector of target area contained within the limiting dashed lines $c_1$ and $c_2$, first in the clockwise and then in the counter-clockwise direction, without the use of any movable antenna control mechanism. It is apparent that by selecting other suitable angular orientations of the gaseous chambers, the sector of angle scanned may be made of any desired value.

Referring to Figs. 2 and 3, showing one embodiment of a combined obstruction locating system and altimeter of the pulse or CW-reflection type in accordance with the invention, for use on an airplane or other aircraft, it includes a transmitter T1 and a receiver R1 coupled through a duplexer $DU_1$, similar to the duplexer DU in the system of Fig. 1, to the common transmitting and receiving antenna A1. The transmitter T1 may be of any type suitable for generating short radio pulses or CW energy during transmitting intervals. The receiver R1 may comprise two similar branches respectively utilized for receiving and suitably processing the echo signals representing obstruction information and altitude information received from the antenna A1 through the duplexer $DU_1$ during receiving intervals. As shown, one of these branches includes the gating amplifier $GA_1$ in its input followed by an obstruction information receiver OR and an associated indicating and measuring circuit $IM_1$, and the other branch includes a similar gating amplifier $GA_2$ in its input followed by the altitude information receiver AR and an associated indicating and measuring circuit $IM_2$. The receivers OR and AR, for example, like the receiver R in the system of Fig. 1, may each comprise a radio receiving circuit of the double-detection, superheterodyne type, and the associated indicating and measuring circuits $IM_1$ and $IM_2$ may each include a video amplifier followed by a cathode ray oscilloscope.

The system of Figs. 2 and 3 also includes a single gas-filled chamber C, similar to each of the gas-filled chambers C1 to C4 in the system of Fig. 1 as described above, mounted within the radome of airplane at a point in front of the common transmitting and receiving antenna A1. The single chamber C is oriented at such an angle with respect to the direction of the radio beam radiated by the antenna A1 during each transmitting interval, that when the gas in the chamber is in the ionized condition, the chamber will operate as a plane reflector to reflect that beam downwardly to the ground and to cause the signal energy (echoes) reflected from ground sent back over the air path to the chamber C to be reflected by that chamber to the antenna A1; and when the gas in the chamber is in the deionized condition, it will allow transmission of the outgoing beam radiated by the antenna A1 directly through the chamber in a straight line in the direction of movement of the airplane, and transmission of the energy (echoes) reflected by obstructions in front of the airplane on which the outgoing beam impinges, back to the antenna A1 through the chamber C.

The ignition circuit $IC_1$ controlled by the timer circuit TC having its operation synchronized with that of the transmitter T1 by a suitable synchronizer $SN_1$, is used to alternately apply a suitable triggering ionizing voltage across the terminal electrodes of the chamber C to cause ionization of the gas therein for a predetermined time interval, and to remove the ionizing triggering voltage from across these electrodes to cause deionization of the gas in the chamber.

During receiving intervals, the echo signals received alternately by the antenna A1 from obstructions in front of the airplane, and from the ground, will pass through the duplexer $DU_1$ to the inputs of the gating amplifier $GA_1$ and $GA_2$, respectively, in the two branches of the receiver R1. The two gating amplifiers $GA_1$ and $GA_2$ are alternately gated on and off in synchronism with the deionization and ionization periods, respectively, of the chamber C under control of the gating circuit GC also synchronized in operation with that of the timer circuit TC through the synchronizer $SN_1$, so as to allow transmission of the echo signals representing obstruction information, through the obstruction receiver OR in one branch and transmission of the echo signals representing altitude information through the altimeter receiver AR in the other branch, to the associated indicating and measuring circuits $IM_1$ and $IM_2$, respectively, which will extract this information and display it on the associated screens to the pilot of the airplane.

While there have been described what are at present considered to be the preferred embodiments of this invention, it will be obvious to those skilled in the art that various changes and modifications may be made therein without departing from the invention and it is, therefore, aimed in the appended claims to cover all such changes and modifications as fall within the true spirit and scope of the invention.

What is claimed is:

1. In combination with an object locating and distance measuring system of the reflection type including a transmitter, a receiver and a common highly directive, transmitting and receiving antenna for periodically radiating electromagnetic energy received from said transmitter, in the form of a beam to a transmission medium, and for receiving and supplying to said receiver the electromagnetic echo energy reflected from objects in said medium on which said beam inpinges: a chamber mounted in front of said antenna in the path of the radiated beam, said chamber comprising an outer shell made from a material normally transparent to electromagnetic wave energy, and an easily ionized and deionized gaseous material within said shell, which when deionized, will allow transmission of the radiated beam and the echo signal energy through the chamber in a straight line with little or no reflection, the construction of said chamber and the electron density of the gaseous material therein being such that when said gaseous material is ionized the chamber operates as a plane reflector of electromagnetic wave energy impressed thereon, said chamber being oriented at a predetermined angle with respect to the normal direction of the radiated beam, so that when the gaseous material therein is ionized, the chamber, by reflection, causes the radiated beam to be pointed in a particular direction other than the normal direction; and means synchronized in operation with that of said transmitter for alternately causing an ionizing voltage to be applied to, and removed from, the gaseous material in said chamber at a predetermined time.

2. In combination with an object locating system of the reflection type including a transmitter, a receiver and a common, highly directive transmitting and receiving antenna for periodically radiating electromagnetic wave energy received from the transmitter, in the form of a beam, to a transmission medium, and for receiving and supplying to said receiver the echo electromagnetic wave energy reflected from objects in said medium on which the radiated beam impinges: an antenna beam scanning system comprising a plurality of chambers mounted in tandem in front of said antenna in the path of the radiated beam, each chamber comprising an outer shell normally transparent to electromagnetic wave energy and an easily ionized and deionized gaseous material within said shell, which, when deionized, will allow transmission of the radiated beam and echo electromagnetic energy therethrough in a straight line with little or no reflections, the construction of each chamber and the electron density of the gaseous material therein, when it is ionized, being such that the chamber operates as a plane reflector of the radiated and reflected electromagnetic wave energy impressed thereon, said chambers being respectively oriented at selected predetermined angles with respect to the normal direction of the radiated beam such that when the gaseous material in one of them is in the ionized condition and that in all the other chambers in the deionized condition, the radiated beam will be pointed in a respectively different direction for each chamber and means synchronized in operation with that of said transmitter for causing ionizing voltages to be applied to, and then removed from, the gaseous material in the several chambers, in a predetermined sequence so that the beam effectively scans a given sector of said medium.

3. A combination object locating system and altimeter of the reflection type for use on an aircraft, comprising a transmitter; a receiver; a common highly directive, transmitting and receiving antenna for periodically radiating electromagnetic wave energy received from said transmitter during transmitting intervals, in the form of a beam into a surrounding air medium, and for receiving and supplying to said receiver during the intermediate receiving intervals the echo electromagnetic wave energy reflected from objects in said medium on which the radiated beam impinges; a single chamber mounted in front of said antenna in the path of the radiated beam, including an outer shell normally transparent to electromagnetic wave energy and an easily ionized and deionized gas within the chamber, which, when deionized, will allow transmission therethrough in a straight line of the radiated beam to obstructions in said medium in front of the aircraft and of the echo electromagnetic energy reflected from said obstructions and carrying information on the locations of said obstructions, to said antenna, the construction of said chamber and the electron density of the gas therein when that gas is in the ionized condition being such that the chamber reflects the beam radiated by said antenna downwardly to ground and reflects the echo electromagnetic wave energy reflected from ground and carrying information on the altitude of the aircraft above the ground, back to said antenna; means synchronized with the operation of said transmitter for causing an ionizing voltage to be alternately applied to, and removed from, the gas in said chamber at timed intervals, said receiver including two branches for respectively extracting altitude information and information on the location of said obstructions from the received echo energy, and gating means operating in synchronism with the voltage applying and removing means for said chamber, for directing the echo signals carrying altitude information and the echo signals carrying the obstruction location information into the proper receiving branch.

References Cited in the file of this patent

UNITED STATES PATENTS

| | | |
|---|---|---|
| 2,407,250 | Busignies | Sept. 10, 1946 |
| 2,693,583 | Rigrod | Nov. 2, 1954 |